United States Patent [19]

Chan

[11] 4,040,100
[45] Aug. 2, 1977

[54] DIGITAL VIDEO TAPE FRAME CODE READOUT SYSTEM

[75] Inventor: Steven S. Chan, Holden, Mass.

[73] Assignee: Adams-Smith Incorporated, Boxborough, Mass.

[21] Appl. No.: 616,589

[22] Filed: Sept. 25, 1975

[51] Int. Cl.$^2$ .......................... G11B 5/02; G11B 5/44
[52] U.S. Cl. ...................................................... 360/43
[58] Field of Search ............................ 360/43, 51, 52

[56] References Cited

U.S. PATENT DOCUMENTS

| | | | |
|---|---|---|---|
| 3,467,955 | 9/1969 | Poomakis | 360/43 |
| 3,623,040 | 11/1971 | Erikson | 360/43 |
| 3,900,890 | 10/1975 | Eibner | 360/51 |

*Primary Examiner*—Vincent P. Canney
*Attorney, Agent, or Firm*—Robert T. Dunn

[57] ABSTRACT

The picture frames recorded on video magnetic tape are identified by serial binary numbers magnetically recorded along an edge of the tape. The sequential ONE and ZERO bits that form each number occur during equal successive intervals when the tape is transported at constant speed and these bits are detected as electrical pulse excursions, one pulse excursion during the interval for a ONE and no excursions during an interval for a ZERO. The pulses are detected even while the tape is not transported at constant speed as when it is accelerating or decelerating and so, the intervals for the successive binary bits may change rapidly and when that occurs, it is difficult to determine whether the successive excursions define a binary ZERO interval or the first half of a binary ONE interval and so, it cannot be determined whether they represent a binary ONE or a binary ZERO. In the present invention, the immediate or current interval between pulse excursions, herein called CT, and the immediately prior time between pulse excursions, referred to herein as PT, are compared and a series of logic steps are made with the following results: (1) when CT and PT are within a predetermined range of each other, then the current bit has the same binary sense as the prior bit; (2) when PT exceeds CT by at least a predetermined amount, then the current bit is a binary ONE; and (3) when CT exceeds PT by a predetermined amount, then the current binary bit is a ZERO.

15 Claims, 8 Drawing Figures

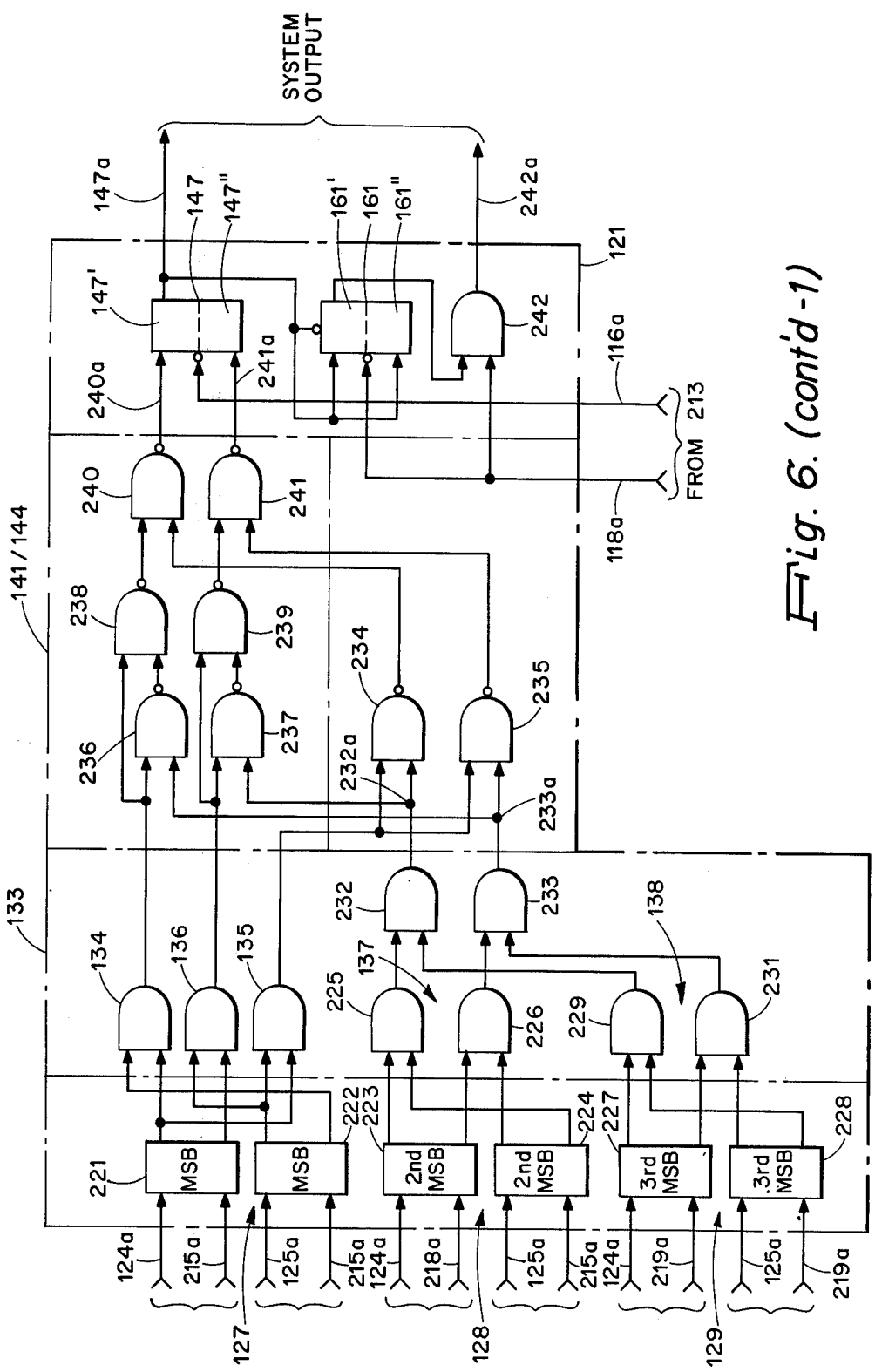
Fig. 6. (cont'd-1)

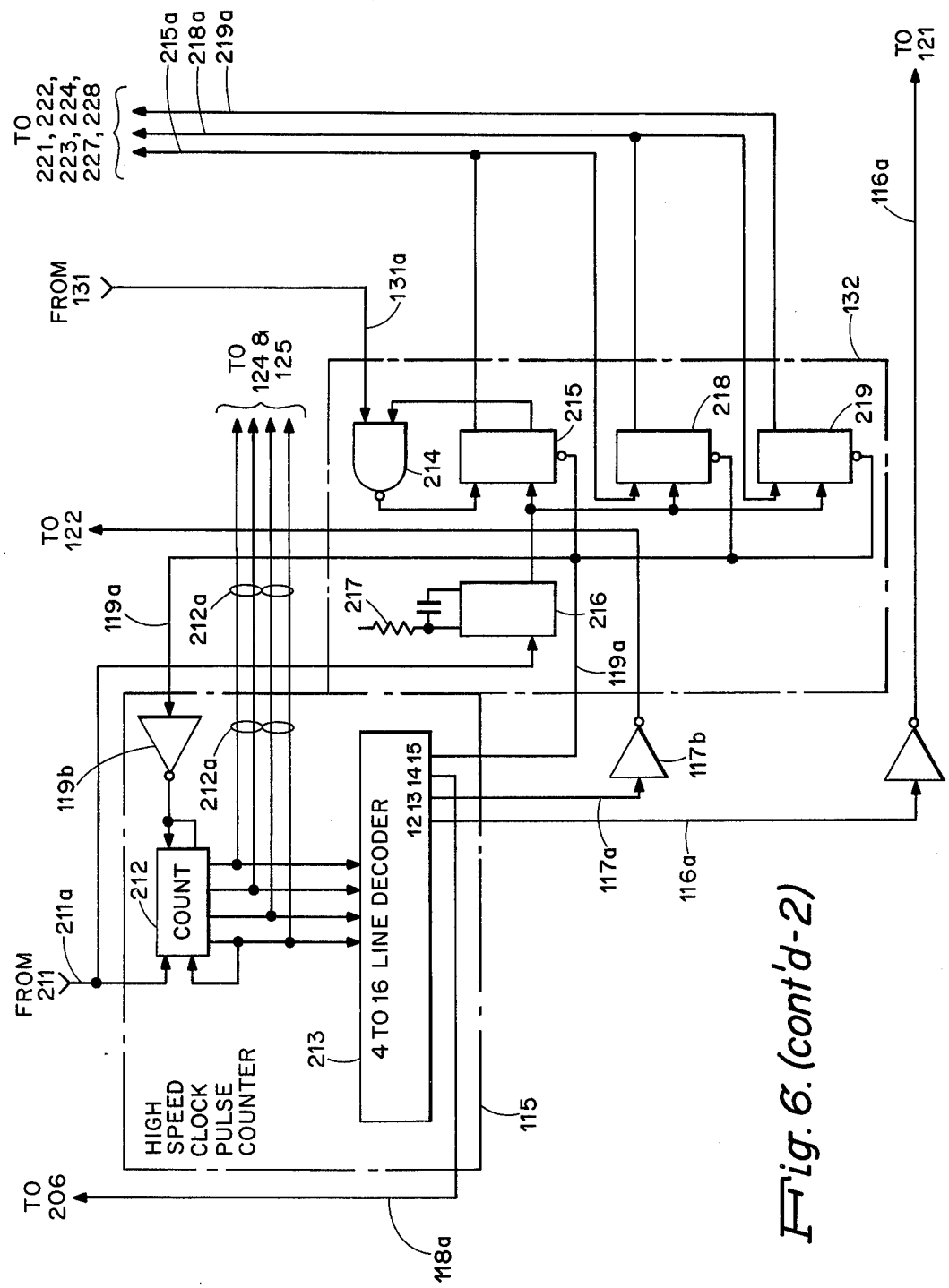
Fig. 6. (cont'd-2)

DIGITAL VIDEO TAPE FRAME CODE READOUT SYSTEM

BACKGROUND OF THE INVENTION

This invention relates to serial binary pulse decoders and, more particularly, to a system for decoding pulse information magnetically recorded on a magnetic tape even while the tape transport speed is increasing or decreasing, and, more particularly, to a system for detecting and decoding serial binary numbers that identify the frames of video information on a video magnetic tape even while the tape is subject to acceleration and deceleration.

Heretofore, the frame numbers on a video magnetic tape that identify successive video frames along the tape have been encoded along the edge of the tape using FM type encoding such as the Manchester or Harvard code. This type of encodement is designed to be used where the binary numbers are detected from the moving tape by a magnetic detecting head and the tape transport speed is substantially constant. In accordance with one encodement of this sort, each frame is identified by a serial binary number made up of successive bit intervals and within each interval, the occurrence of a single pulse represents a binary ZERO for that interval while the occurrence of two pulses represents a binary ONE for that interval. Detection and encodement are accomplished in a relatively conventional fashion when the tape transport speed is substantially constant or changes very little between frame numbers. However, where the tape transport speed changes rapidly during the detection of a single frame number, the time interval between successive binary bits of the number changes so much that the system cannot distinguish between a binary ZERO and a binary ONE by simple comparison. For example, the successive bit intervals decrease when the tape accelerates and increase when the tape decelerates and these decreases and increases are sometimes so large that a simple comparison of each present or current pulse interval with the prior pulse interval to establish the binary sense of the present bit is not reliable.

SUMMARY OF THE INVENTION

It is an object of the present invention to provide a system for decoding a serial binary number encoded by a form of FM encoding which is capable of accurate decoding even when the rate or detection of the serial binary number changes rapidly during detection.

It is another object of the present invention to provide a system for decoding a serial binary number encoded by FM encoding wherein at least some of the limitations of prior systems are avoided.

It is another object to provide a system for determining the frame numbers on a video magnetic tape while the tape is transported at high speed.

It is a further object to determine the frame numbers even when the tape transport speed changes rapidly during reading of a single frame number.

It is another object to provide a binary logic computer system capable of reading the FM encoded frame numbers from a video tape transported at high speeds, even during accelerations and decelerations of the tape.

It is a further object in conjunction with the above to provide such a system of binary logic circuits with sufficient redundancy to insure reliable determination of the video tape frame numbers even when the tape accelerates or decelerates substantially during a frame.

All features of the present invention described herein are included in the embodiment of the invention described. That embodiment is a system for detecting FM encoded binary numbers along the edge of a video magnetic tape while the tape is transported at high speed and for computing all bits of the binary numbers, even while the tape is accelerating or decelerating past a stationary magnetic detector head. This embodiment represents the best known use of the present invention. However, other uses of the features of the invention, singly or in various combinations will be apparent to those skilled in the art in those systems where it is desired to determine an encoded serial binary number where the number bit rate during detection changes rapidly.

In accordance with the embodiment described herein, the frames of magnetically recorded information along a magnetic tape are identified by serial binary numbers magnetically encoded along an edge of the tape. The binary bits of each number are encoded at equal sequential spatial intervals along the edge of the tape. Where a single magnetic impulse is recorded during a bit interval, it is detected as a pulse which fills the interval and so, there is a pulse excursion at the beginning of the interval and at the end of the interval and the time interval between those excursions when the tape is moving at constant speed past a magnetic detector head, is a constant interval and represents a binary ZERO. On the other hand, when there are two magnetic impulses in sequence encoded within a spatial interval along the edge of the tape, the magnetic detector head produces three pulse excursions one at the beginning of the interval, one at the middle of the interval and one at the end of the interval and the time interval between successive of these excursions when the tape is moving at the constant speed past the magnetic detector head, is one-half the time interval between excursions that represent a binary ZERO. Hence, when the longer interval is detected, it represents a binary ZERO and when the shorter interval (one-half the longer interval) is detected, it represents a binary ONE.

In the present invention, the present or current interval between pulse excursions, also called current pulse interval time, CT, and the immediately prior interval between excursions, also called herein the prior pulse interval time, PT, are produced and referred to herein as the CT signal and the PT signal. These signals are compared to determine whether the current pulse is a binary ONE or a binary ZERO. The basis of the comparison is that when the greater of CT and PT does not exceed the lesser by more than a given fractional amount, then the current bit has the same binary sense as the prior bit. However, where one does exceed the other by an amount greater than the given fractional amount, then a sequence of logic is employed to determine the binary sense represented by the current pulse interval time, CT.

In the embodiment described herein, a clock pulse generator produces clock pulses at a rate several orders or magnitude greater than the maximum pulse rate detected by the magnetic detector head and during the interval, CT, the clock pulses are counted, producing a current pulse time interval count, denoted herein as CCT and means are provided for storing CCT during the subsequent interval. Hence, the stored value of CCT becomes PCT and these numbers, CCT and PCT, are compared to produce first, second and third output control signals that determine whether the current pulse is a binary ONE or a binary ZERO.

The comparison of CCT and PCT is of the N most significant bits of the greater of the two numbers with the N bits of the same significance of the smaller of the two numbers. Clearly, by comparing less than all of the bits of both numbers with each other, the comparison is accomplished with fewer circuits and in less time. In effect, the comparison produces the first output control signal when the larger of PCT and CCT does not exceed the smaller by more than a given fractional amount. The second output control signal is produced when PCT does exceed CCT by an amount greater than the given fractional amount and the third control signal is produced when CCT exceeds PCT by an amount greater than the given fractional amount.

The first output control signal causes the output to produce a binary signal in representation of the current pulse which is the same as the binary signal produced in representation of the prior pulse. The second output control signal causes the output to produce a binary ZERO in representation of the current pulse and the third signal causes the output to produce a binary ONE in representation of the current pulse. In this manner, the current binary bits detected from the moving tape are determined even when the tape is accelerating and decelerating. Clearly, the accuracy of this system can be increased by increasing the number N of significant bits that are compared. In the embodiment described herein, N is set at three and results in suitable performance of this embodiment of the invention.

These and other objects and features of the present invention will become apparent in view of the following specific description of the embodiment which incorporates those features and is shown in the accompanying figures.

DESCRIPTION OF EMBODIMENTS OF THE INVENTION

Figure 1:
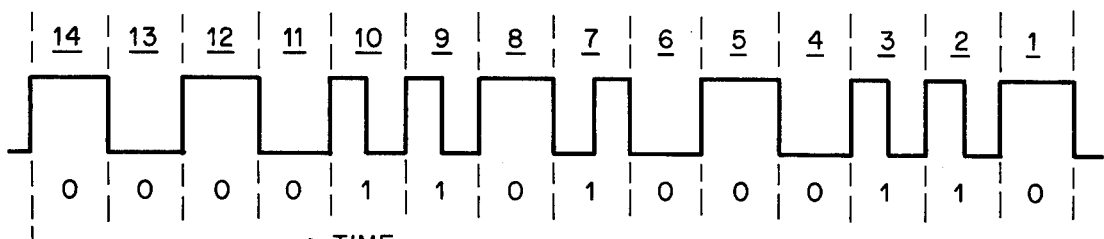
FIGS. 1, 2 and 3 are wave form diagrams representing, respectively, an FM encoded serial binary number detected at constant speed, accelerating speed and decelerating speed.

A serial binary number encoded along the edge of a video magnetic tape is encoded using FM type encoding such as the Manchester or Harvard code. The binary bits of the encoded number are located at regularly spaced intervals along the edge of the tape and each bit is represented by a magnetic impression on the tape so that when these magnetic impressions are detected by a magnetic detector head, the head produces electrical pulses such as shown in FIG. 1 as the tape moves past the head at constant speed. The wave form in FIG. 1 shows a portion of such an encoded number as represented by the pulses from the magnetic detector head. As can be seen, the binary bit intervals, denoted by the broken lines, are regularly spaced in time and, in other words, the bit intervals are constant. Clearly, the time duration or time length of the constant bit intervals depends upon the spatial intervals along the tape and the speed of the tape with reference to the head. The binary number represented by the wave form in FIG. 1 is a 14 bit number of which the most significant bits are detected first in time. The bits are numbered in order of significance. The first four significant bits are binary ZEROS and so they are each represented by a single pulse of duration equal to the interval, or, in other words, each is represented by two pulse excursions, one at the beginning of the interval and one at the end of the interval and the excursion at the end of an interval is also the first excursion of the subsequent interval. Stated in another way, a binary ZERO occurs where there is no pulse excursion between the beginning and end of an interval. On the other hand, where a binary ONE is represented as in bits ten and nine, there is a pulse excursion at the middle of the interval. Hence, if the wave form, shown in FIG. 1, initiates and terminates operation of a counter at each pair of excursions of the wave form, successive count numbers will be produced representing bits fourteen to eleven which will be equal. Then, the 10th bit will be represented by two successive count numbers which are equal and exactly one-half the previous four count numbers. This will indicate at the 10th bit a binary ONE. Likewise, the ninth bit will be indicated by two count numbers just as the 10th bit and then the eighth bit will be a full count indicating a binary ZERO and so on for all the rest of the bits of the stored number. When the tape moves at constant speed, the bit intervals are equal, as shown in FIG. 1 and there is no problem in determining from the count numbers where in time the successive bit intervals begin and end and what bit is indicated by each interval. However, when the tape rapidly changes speed during detection of the number, the interval time durations change from bit to bit and if they change sufficiently rapidly, a simple comparison of successive count numbers can result in errors.

Figure 2:
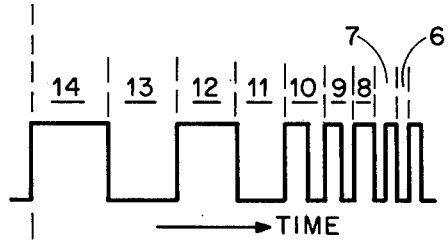

For example, when the tape accelerates rapidly while detecting the stored number represented by FIG. 1, the bit intervals rapidly decrease as shown by the wave form in FIG. 2 and so, the count numbers rapidly decrease and it is difficult to determine which represents a binary ZERO and which represents a binary ONE. The same problem also occurs when the tape rapidly decelerates while detecting a stored number. In that case, the bit intervals rapidly increase and so do the count numbers representing binary ONE or binary ZERO. This is shown by the wave form in FIG. 3.

If the acceleration of the tape is very rapid while a number is being detected, then a count number representing a full interval (binary ZERO) at the end of the detection may be shorter than the count of half an interval, representing a binary ONE, at the beginning of the count. Similarly, if the tape decelerates rapidly, then a count number of half a bit interval toward the end of detection of the number may be greater than a count of the full interval at the beginning of detection. In either case, a simple comparison of the count numbers with, for example, a standard interval count at the beginning of detection of the number, is not satisfactory and will result in error.

In accordance with the present invention, the interval of each successive pulse produced at the output of the magnetic detector head is represented by a count of relatively high speed clock pulses during the interval of the pulse. This is done with a counter, and the output of the counter at the end of a pulse is the CCT. CCT is compared with the previous count stored in a register, PCT. The comparison is of the first N significant bits of the greater of CCT and PCT with the bits of the same significance of the lesser of CCT and PCT to determine the first, second and third output control signals mentioned above. Where N is three, the logic of this comparison is as represented by the chart shown in FIG. 4.

Figure 4:
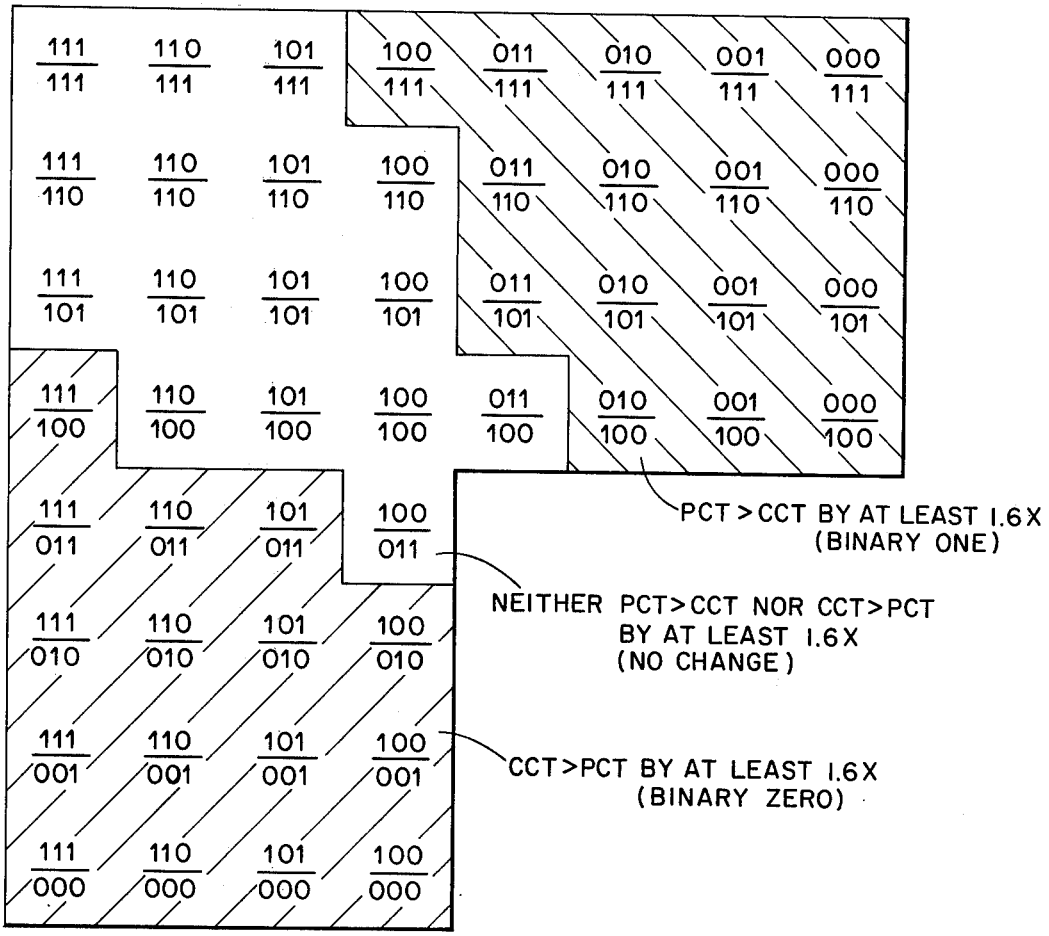
FIG. 4 is a chart showing the logic and decisions performed to determine the three output control signals that in turn determine whether the current pulse is a binary ONE or a binary ZERO.

The upper left portion of the chart in FIG. 4, which is not cross-hatched shows all combinations of values of the first three significant bits of CCT and PCT which cause the first output control signal to be produced. When the first output control signal is produced, the output of the system representing the binary sense of the current bit being detected is the same as the immediately prior bit detected. In other words, CCT and PCT do not differ from each other by more than a given fractional amount.

The upper right hand part of the chart in FIG. 4, which is cross-hatched by lines slanting downward to the right shows all combinations of the first three significant bits of CCT and PCT which produce the second output control signal. The second output control signal causes the system to produce a signal representing a binary ONE as the current detected bit.

The lower left portion of the chart in FIG. 4 which is cross-hatched by lines sloping downward to the left shows all combinations of the first three bits of CCT and PCT which produce the third output control signal. The third signal causes the system to produce a signal representing a binary ZERO as the current detected bit.

As revealed by the chart in FIG. 4, when PCT is at least about 1.6 times CCT, the second control signal is produced and when CCT is at least about 1.6 times PCT, the third control signal is produced.

Figure 5:
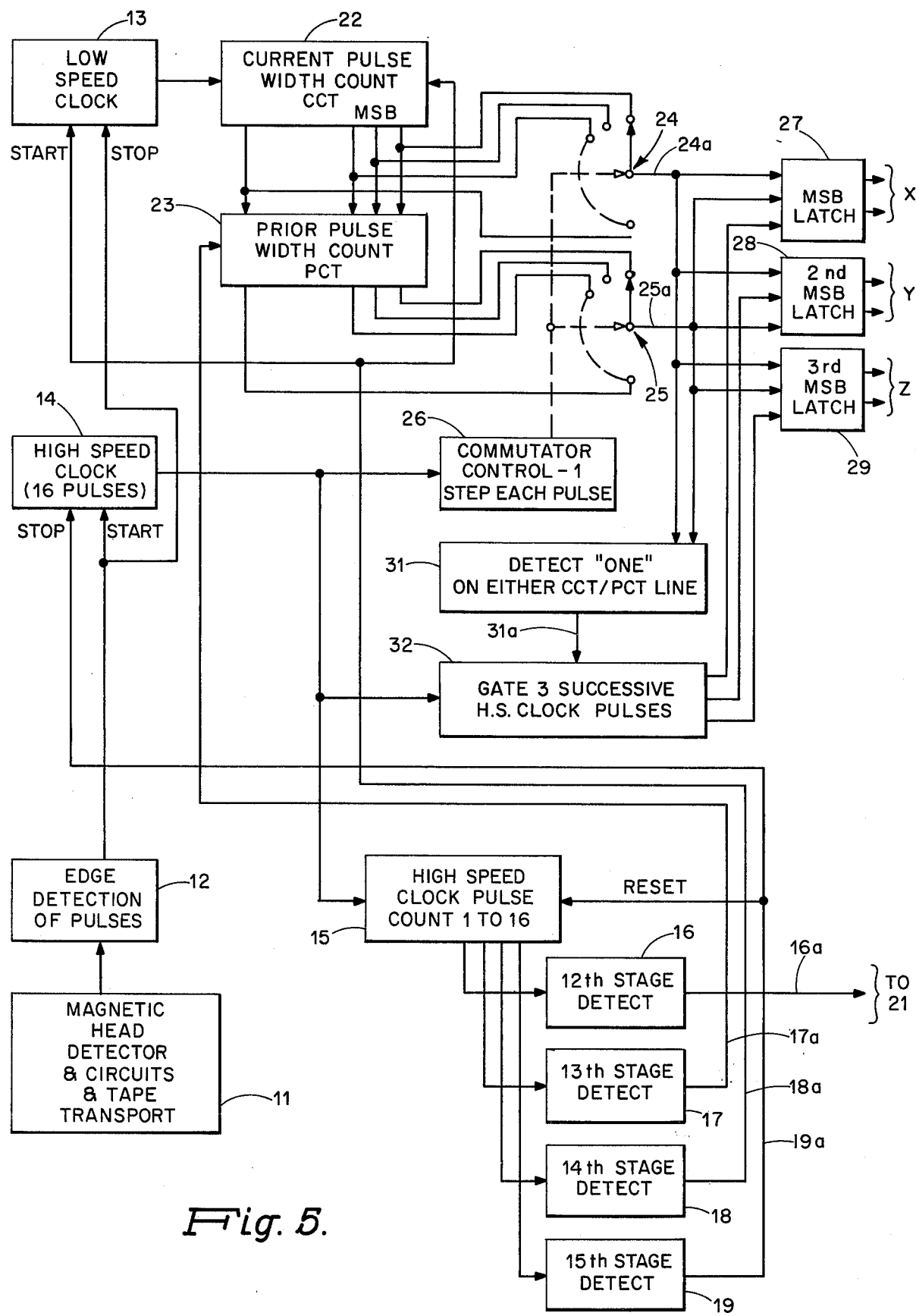
FIG. 5 is a flow diagram illustrating the logic of a system incorporating features of the present invention and including the logic illustrated by the chart of FIG. 4.
Figure 5:
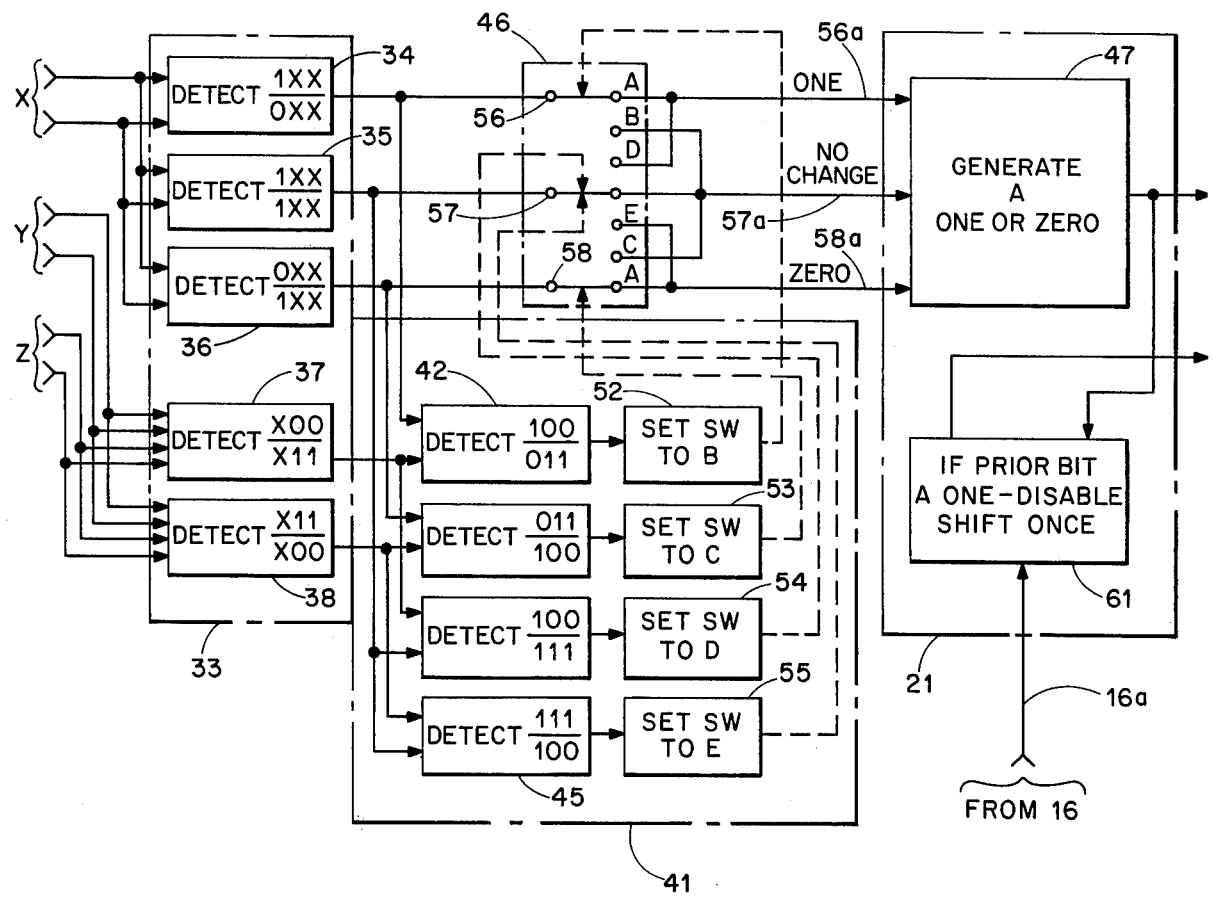

A system which accomplishes the logic shown in the chart of FIG. 4 is illustrated by the functional block diagram of FIG. 5. As shown in FIG. 5, the magnetic head detector circuit 11 produces pulse signals such as represented by any of the wave forms of FIGS. 1, 2 or 3 when a tape on a transport mechanism (not shown) is driven past the magnetic head of the circuit. The output of this detector circuit 11 is fed to a pulse edge detector 12 which detects the pulse excursions and produces a sharp spike signal at each excursion, herein called the pulse edge signals. The pulse edge signals are fed to the low speed clock 13 to stop the clock and also to high speed logic clock 14 to start the high speed clock. The low speed clock 13 produces the main clock pulses which may be at the rate of 2 to 4 megahertz. The high speed clock 14 produces only an initial burst of pulses at the start of each pulse interval and may operate at 7 to 10 megahertz. The purpose of the burst of high speed pulses is to schedule the sequence of logic steps performed by the system, clear counters, control commutation actions by which the successive bits of CCT and PCT are examined, synchronize spilling the CCT count into the PCT register and start the low speed clock 13.

Pulses from high speed clock 14 are fed to high speed clock pulse counter 15 which counts to, for example, the number sixteen and produces pulse outputs upon the occurrence of the 12th, 13th, 14th and 15th count as represented by functions 16, 17, 18 and 19, respectively. At the count of 12, a pulse from 16 triggers the system output circuit 21. At the 13th count of counter 15, a pulse from 17 clears the current count register 22. At the 14th count, a pulse from 18 starts the low speed clock 13. At the count of 15, a pulse from 19 resets counter 15 stops the high speed clock 14 and clears the three latching circuits 27 to 29.

Figure 7:
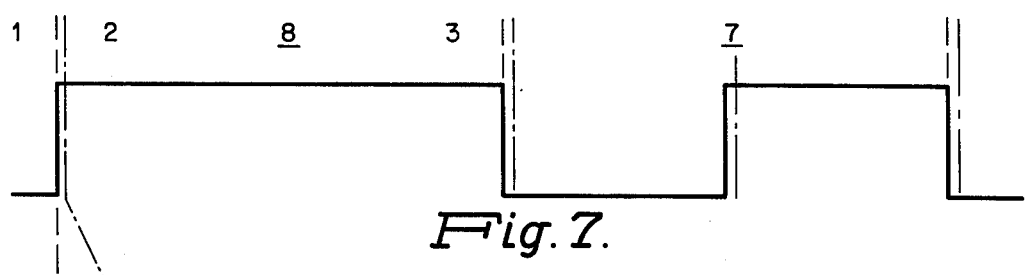
FIG. 7 is an enlarged representation of a portion of the wave form of FIG. 1 showing bit intervals 8 and 7, showing the portions of wave form pulses during which logic computation is clocked.
Figure 8:
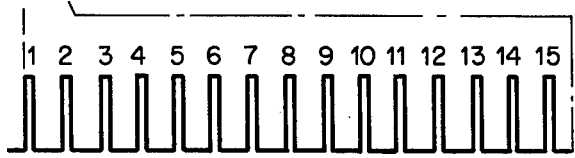
FIG. 8 is an enlarged representation of said portions of the wave form of FIG. 7 showing the logic clocking pulses.

The wave form in FIG. 7 illustrates the occurrence of the one to sixteen count of high speed clock pulse counter 15 relative to the count of pulses from low speed clock 13 by the current pulse width counter 22. This wave form shows the eighth and seventh bit intervals of the number represented by the wave form of FIG. 1. At the occurrence of a pulse edge signal from detector 12, represented by line 1 of this wave form, the eighth binary interval commences, however, the low speed clock 13 does not start. Thereafter, for 16 counts of the high speed clock, the various functions described above are accomplished and completed at the time represented by line 2 in the wave form. At line 2, the count of low speed clock pulses by counter 22 commences and continues throughout the rest of interval 8 until the end of interval 8 represented by line 3 in the wave form. At the time represented by line 3, the high speed clock starts again and the count of 16 high speed clock pulses starts again. Clearly during the count of the 16 high speed clock pulses, all comparisons of CCT and PCT and the logic for determining the binary bit represented by the current pulse detected by the magnetic head circuit 11 is performed. This interval of the 16 high speed clock pulses is shown expanded by the wave form in FIG. 8.

In a typical video tape frame detection system, the pulse rate from the detector circuit 11 is on the order of about 2,400 bits per second and so, when the low speed clock rate is 2 to 3 megahertz, counter 22 will count to about one thousand for a binary ZERO and less for a binary ONE. If this count does not begin for 2 to 3 microseconds after the beginning of the interval as represented by line 1 in FIG. 7, the number in counter 22 will still be accurate to better than 99%. Hence, the very slight error introduced by using a very small portion of the beginning of the interval in which to accomplish the logic computations and other functions is insignificant.

If one chooses to use two sets of current count, CCT, registers and two sets of previous count, PCT, registers, one can achieve total information set use, one set of CCT's and PCT's can be used for comparisons while the other sets are used for counting. Some additional logic will be required to switch from either set, but that is nominal.

Since the count number, CCT is about one thousand or less at normal constant tape speed of a typical video tape system, a counter 22 should have at least ten stages. In order to accomodate deceleration of the tape which results in longer intervals, the counter 22 should have at least twelve stages and so, it is capable of counting up to about four thousand. The output of several of the most significant bit stages of counter 22 are fed to successive terminals of the current pulse commutator 24. Similarly, the outputs of the several most significant bits of register 23 (which has the same number of stages as the counter 22) are fed to successive terminals of the prior pulse commutator 25. These commutators 24 and 25 are represented in FIG. 5 as mechanical. This representation, however, is made only to show the functions of the commutators. In practice, they would be electronic circuits as described in FIG. 6. The commutators are stepped together by the output of stepping circuit 26 which responds to the start-up of the high speed clock 14 and initiates a step of each of the commutators 24 and 25 with each successive pulse from the high speed clock. Where, for example, there are 12 stages in counter 22 and 12 stages in register 23, then there are 12 terminals in each of the commutators and each commutator steps through all twelve terminals in synchronism with the first 12 high speed clock pulses and so, the commutator action is completed at the 12th count of high speed pulse counter 15.

The outputs of commutators 24 and 25 in lines 24a and 25a are each fed to each of three latching circuits, the most significant bit latch 27, the second most dignificant bit latch 28 and the third most significant bit latch 29. Both outputs are also fed to a detect "1" on either line circuit 31 that produces an enabling pulse in its output on line 31a that enables the gate 32. This gate gates three successive high speed clock pulses in the order in which they occur to the latching circuits 27, 28 and 29, respectively. Accordingly, when a binary ONE appears in the output of either of the commutators, the most significant bit of the greater of CCT or PCT is identified and that bit and the next two bits become the three most significant bits of the greater of CCT and PCT. These three most significant bits and the corresponding bits from the lesser of CCT and PCT are fed through the three latching circuits to the logic group 33.

The functions of logic group 33 are identified by the logic blocks 34 to 38. Block 34 detects when the most significant bit of CCT is ONE and of PCT is ZERO. Block 35 detects when both are ONE and block 36 detects when the most significant bit of CCT is ZERO and of PCT is ONE. Clearly, there are the first steps in performing the logic shown by the chart in FIG. 4. The second step in performing this logic is performed by function blocks 37 and 38. Block 37 detects when the second and third most significant bits of CCT are both ZERO and of PCT are both ONE. Block 38 detects when the second and third most significant bits of CCT are both ONE and of PCT are both ZERO.

The third step in determining the logic represented by the chart in FIG. 4 is accomplished by logic circuits 41 which include logic blocks 42 to 45 that compute the exceptions shown in the chart at the borders of the three sets of conditions. Blocks 42 and 43 detect the two conditions that are included within those that produce the first output control signal that says the current bit is the same as the prior bit. Block 44 detects the condition that is included with those that produce the second output control signal that says that the current bit is a binary ONE. Block 45 detects the condition to be included with those that produce the third output control signal that says that the current bit is a binary ZERO.

Between the output circuit 21 and the two logic system 33 and 41, the functions are represented by three switches 46. The functions of these switches are implicit as the switches are shown and they feed the output control signal generator to the output circuit 21. The switches are each controlled by one or more of the outputs of blocks 42 to 45 by the corresponding switch-set functions 52 to 55, respectively. The three switches 56 to 58 each have output terminals as shown. Switch 56 is controlled by the output of 52, switch 57 is controlled in one direction by the output of 54 and in the opposite direction by the output of 55 and switch 58 is controlled by the output of 53. As will be seen, the outputs of switches 56 to 58 on lines 56a to 58a fed to the generator 47 in the output circuit 21 carry the three output control signals. Line 57a carries the first output control signal, line 56a carries the second and line 58a carries the third.

Inspection of the logic blocks 33 and 41, switches 46 and the output circuit 21 in FIG. 5 shows the following: when block 45 produces an output and at the same time neither of blocks 44 nor 45 produce an output, then one of the logic conditions shown in the chart 44 in the area which is not cross-hatched has occurred. This means that the current bit detected by the magnetic head is the same as the prior bit, and so the output of generator 47 fed to shift register 61 that stores the previous output from generator 47, causes the stored output to be shifted out of the system as the current output of the system. When there is an output from block 36 and at the same time there is no output from 43, then one of the conditions shown in the chart of FIG. 4 cross-hatched by lines slanting downward from the left to the right has occurred. When there is an output from block 34 and at the same time there is no output from block 42, then one of the conditions producing the third output control signal has occurred. Again, these conditions are shown by the chart in FIG. 4 as contained in the area cross-hatched by lines sloping downward from right to left.

These conditions account for most of the logic shown in the chart of FIG. 4. In addition, when there is an output from block 15 and also an output from block 14, switch 57 is positioned at its D terminal feeding the output from 35 to line 56a causing the generator to generate a binary ZERO. Similarly, the other exceptions shown in the chart of FIG. 4 are determined and the output circuit 21 is energized accordingly to produce an output signal from the system in accordance with the logic described with reference to the chart of FIG. 4. It should be noted that only one of the lines 34a, 35a and 36a outputs from blocks 34, 35 and 36, respectively, is activated at a time. Furthermore, at the other side of 46, only one of lines 56a, 57a and 58a is activated at a time. The function of block 46 is to match the activated one of lines 34a, 35a or 36a to one of the initiating lines 56a, 57a or 58a. When 56a is activated, a ZERO is generated; when 57a is activated there is no change; and when 58a is activated, a ONE is generated.

Figure 6:
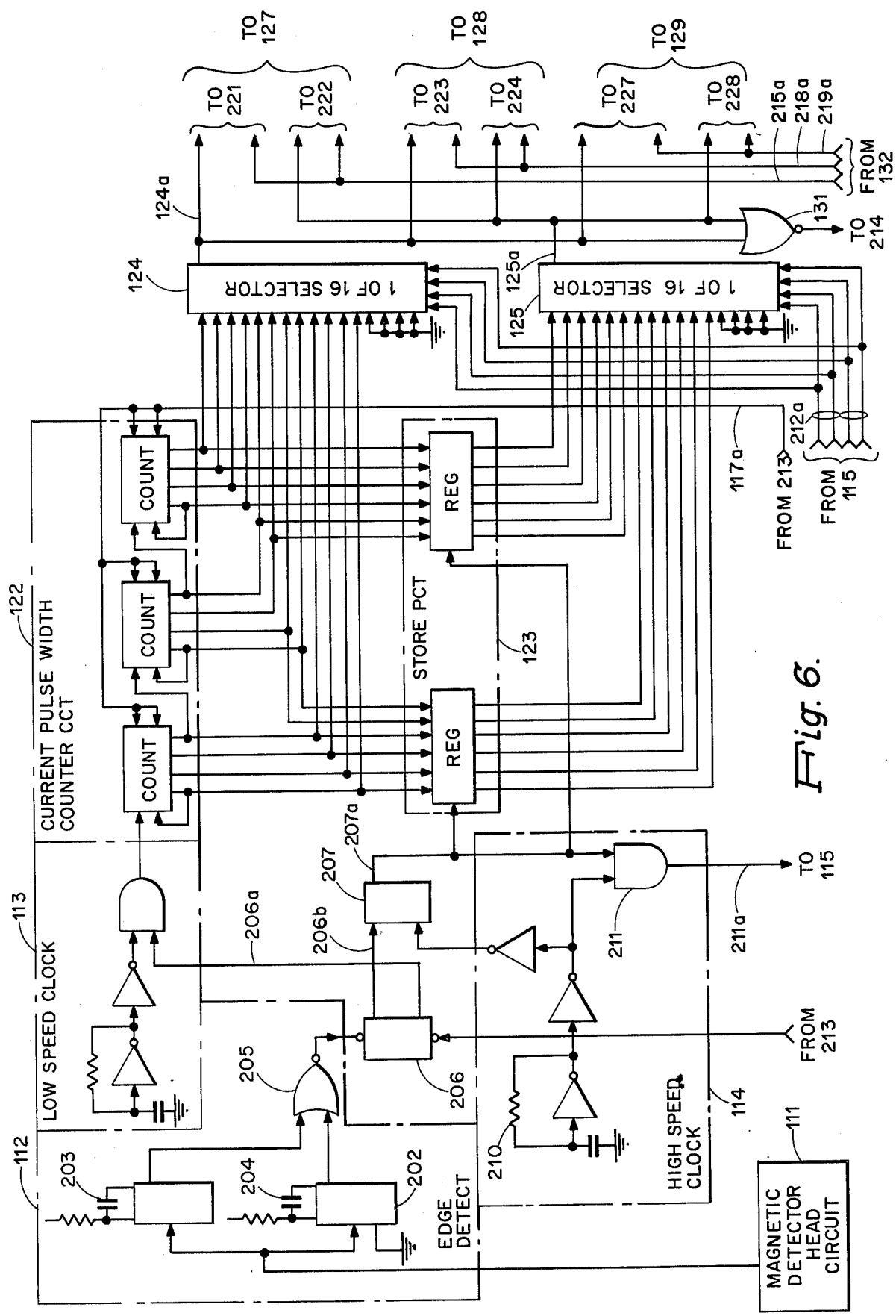
FIG. 6 is a detail block diagram showing electronic circuits of conventional kinds for performing the functions of the system.

Turning next to FIG. 6, there is shown an electrical block diagram made up of conventional electrical circuits for computing the functions substantially as described with reference to FIG. 5. The blocks of component parts shown in FIG. 6 generally perform the functions identified in FIG. 5 and the reference numbers to the blocks in FIG. 6 relate to the reference numbers of the functions in FIG. 5 in that reference numbers in FIG. 6 are 100 greater as an aid in relating the two figures. With that in mind, the following is a description of the electrical system shown in FIG. 6.

Figure 3:
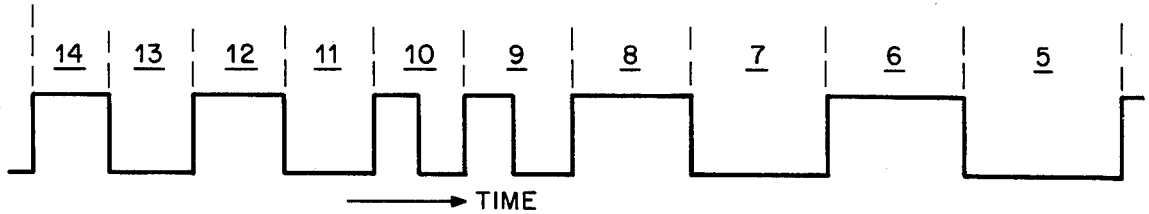

The output of the magnetic head detector including pulse signals such as shown in FIGS. 1, 2 or 3 is fed to the edge detector circuit 112 that includes two monostable multivibrator 201 and 202, each producing a clock trigger pulse at an excursion of the pulse signal from the detector. The trigger pulses are the same duration as determined by the timing circuits 203 and 204 coupled to the output sides thereof. For example, multivibrator 201 produces the output pulse in response to a positive going excursion of the pulse signals from the detector head and 202 produces the trigger pulse in response to a negative going excursion. These trigger pulses are fed to NOR circuit 205 which feeds one input of reset-set (R-A) flip-flop circuit 206. The other input to 206 is from line 118a from high speed counter 115 which carries the output of the fourteenth stage of counter 115. Hence, one output line 206a from flip-flop 206 carries both start and stop signals to the low speed clock 113. The other output on line 206b is fed to the input of flip-flop 207 and the other input to 207 is from the high speed clock 114 and so 207 acts as a pulse synchronizer.

Low speed clock 113 includes an oscillator 208 feeding one input of AND circuit 209. The other input to AND circuit 209 is from line 206a. Similarly, in the high speed clock 114 there is an oscillator 210 the output of which is fed to one input of AND circuit 211 and the other input to 211 is from the output of flip-flop 207. Thus, the output of the low speed clock is on line 209a and the output of the high speed clock is on line 211a. In both clocks the oscillators operate continually and the outputs of the oscillators are gated to produce low speed clock pulses for counting by counter 122 and high speed clock pulses for counting by counter 115.

The high speed oscillator 210 operates at 7 to 10 megahertz and so the high speed pulses on line 211a at this rate are counted when fed to counter 115. That counter includes a one to sixteen counter 212 feeding a four line to sixteen line decoder 213. At the 12th, 13th, 14th and 15th count stages of decoder 213 lines 116a, 117a, 118a and 119a, respectively, carry the count signals. Line 116a carries the 12th count signal to the output circuit 121, line 117a carries the thirteenth count signal through inverter 117b to counter 122 where this signal clears counters 122. Line 118a carries the 14th count to R-S flip-flo 206, as already described, and, in effect, starts the feed of low speed clock pulses to counter 122 by opening AND gate circuit 209. Line 119a carries the 15th count through inverter 119b to one to sixteen counter 212, clearing that counter. Line 119a also carries the 15th count to the gate circuits 132 that gate three successive high speed clock pulses to the latching circuits 127, 128 and 129 to clear the outputs of gates 132.

Gates 132 perform the same function as the function block 32 in FIG. 5. That is, they gate three successive high speed clock pulses to the latching circuits 127, 128 and 129 upon the occurrence of a ONE in the stepped selection of the CCT number stored in counter 122 or the PCT number stored in register 123. The commutator function represented by commutators 24 and 25 in FIG. 5 are performed by the one to sixteen selector circuits 124 and 125, respectively. The outputs of the 12 stages of counter 122 feed selector 124 and the outputs of the 12 stages of register 123 feed selector 125. The output of selector 124 appears on line 124a and the output of selector 125 appears on line 125a. These selectors step together successively feeding the signals at their inputs to their outputs as pulses are successively fed to them from the output of one to sixteen counter 212. Lines 212a feed all of the successive counts of counter 212 on the four lines 212a to selectors 124 and 125 causing the selectors to step through and sample each of their 16 inputs. At the twelfth count from counter 212, the selectors complete stepping through the 12 inputs from counter 122 and register 123. The last four inputs to each selector are grounded and so as the selector steps through the last four inputs, no outputs appear on lines 124a or 125a.

The selector output lines 124a and 125a feed NOR circuit 131 whose function is to detect a ONE on either line and commence the gating operation of gates 132 to feed three successive high speed clock pulses to the latching circuits 127, 128 and 129. In the gates 132, the output of 131 is fed to an input of NAND circuit 214. The other input to NAND circuit 214 is from an output of S-type flip-flop circuit 215. One input to 215 is high speed clock pulses from line 211a controlled by monostable multivibrator 216 which has a time constant set by timing circuit 217. The other output from flip-flop 215 on line 215a is a pulse of duration determined by the time constant of circuit 217 and coincident with the first ONE signal in the output of either of selectors 124 or 125. This signal is fed to latching circuits 127.

The other two S-type flip-flop circuits 218 and 219 in gates 132 operate the same as 215 and feed pulses of lines 218a and 219a to latching circuits 128 and 129, respectively. The pulse signal on line 218a is coincident with the next output from the selectors following the occurrence of a ONE in the output of either selector and a signal on line 219a is coincident with the output next after that.

Latching circuits 127, upon the occurrence of the first ONE in the outputs of the selectors 124 or 125, feed the most significant bits from these selectors to the first step logic detectors 133. Latching circuits 128 feed the second most significant bit from both the selectors to circuits 133 and latching circuits 129 feed the third most significant bit from the selectors to those circuits. In circuits 133, AND circuits 134, 135 and 136, in conjunction with latching circuits 127, perform the logic already described with reference to logic blocks 34, 35 and 36 in FIG. 5. The latching circuits 127 include latches 221 and 222, both controlled by the signal in line 215a for feeding the most significant bits from selectors 124 and 125, respectively, to the three AND circuits 134 to 136. Similarly, latching circuits 128 include two latches 223 and 224 controlled by the signal in line 218a for feeding the second most significant bits from the selectors 124 and 125, respectively to AND circuits 225 and 226. Also, similarly, latching circuits 129 include two latches 227 and 228 controlled by the signal in line 219a for feeding the third most significant bits from selectors 124 and 125, respectively, to AND circuits 229 and 231 of the first step logic circuits 133.

The outputs of AND circuits 225, 226, 229 and 231 are fed to AND circuits 232 and 233 and so the outputs of these correspond in function to the outputs of logic detector 37 and 38 in FIG. 5.

The function of the three switches 56 to 58 in FIG. 5, the controls for those switches from 52 to 55 and the functions of logic blocks third to 45 in FIG. 5 are all performed by the NAND circuits 141/144.

The NAND circuits 141/144 include eight NAND circuits 134 to 241 and, in effect, produce at the outputs of 240 and 241 the first, second and third output control signals which dictate whether the output of the system for the current pulse detected from the moving tape shall be the same as the prior pulse or shall be a binary ONE or a binary ZERO.

The output circuit 121 includes JK flip-flop circuit 147 to which the inputs are the outputs on lines 240a and 241a from NAND circuits 240 and 241. Depending on the logic conditions present on lines 240a and 241a, output line 147a will assert a binary ONE, a binary ZERO, or remain unchanged from the previous condition. The output is clocked by line 116a from circuit 213. Once the output is clocked, line 118a then signals through AND circuit 242 on line 242a that the output is ready, or one bit has been detected. A JK flip-flop circuit 161 prevents line 242a from pulsing twice in the case of detecting a binary ONE which has an extra transition inbetween marked intervals by disabling AND circuit 242 for the second pulse coming in from line 116a. After disabling it once, it resets itself as part of the function of a JF flip-flop.

A generic embodiment of the present invention embodies the effect of the logic expressed in the chart of FIG. 4 and this is performed functionally as described in either of FIGS. 5 or 6. The particular circuits which accomplish the objects of this invention are described in detail in FIG. 6 and represent one suitable arrangement of circuits for doing this. Other circuits and arrangements of circuits will be apparent to those skilled in the art to perform the functions expressed in FIG. 5 and the functions performed by the circuits in FIG. 6 and are within the scope of the appended claims.

What is claimed is:

1. A system for detecting the successive binary bits of a binary number recorded on a moving tape comprising:
   a bit detector;
   means for moving the tape relative to the detector whereby the detector produces electrical pulses representing detecting bits;
   means for producing clock pulses,
   means responsive to said detected bit pulses and said clock pulses for producing a binary number, CCT, repesentative of the time duration of the current pulse and a binary number, PCT, representative of the time duration of the pulse prior to the current pulse;
   means for comparing the N most significant bits of CCT with the corresponding N most significant binary bits of PCT producing comparison signals;
   means responsive to said comparison signals for producing binary output signals from the system as follows:
      the same binary output signal that represents the prior pulse when the ratio of the larger to CCT and PCT of the smaller is less than a pedetermined values R, or
      a binary ONE when the ratio of PCT to CCT is greater than R, or
      a binary ZERO when the ratio of CCT to PCT is greater than R.

2. A system for detecting the successive binary bits of a binary number recorded on a moving tape comprising:
   a bit detector;
   means for moving the tape relative to the detector whereby the detector produces electrical pulses representing detected bits;
   means producing clock pulses,
   means responsive to said detected bit pulses and said clock pulses for producing a current pulse count time binary number, CCT, representative of the time duration of the current pulse and a prior pulse count time binary number, PCT, representative of the time duration of the pulse prior to the current pulse;
   means for comparing the N most significant binary bits of CCT with the corresponding N most significant binary bits of PCT producing comparison signals;
   means responsive to said comparison signals for producing output control signals as follows:
      a first signal when the corresponding most significant bits of CCT and PCT are both binary ONE,
      a second signal when the corresponding most significant bits of PCT is binary ONE and CCT is binary ZERO and a third signal when the corresponding most significant bits of CCT is binary ONE and PCT is binary ZERO;
   an output circuit for producing a binary ONE signal or a binary ZERO signal representative of the current pulse and for storing the binary output thereof representative of the pulse immediately prior to said current pulse; and
   said output circuit is responsive to said first, second and third output signals producing a binary ONE or a binary ZERO output signal representative of the current pulse as follows:
      the same binary signal that represents the prior pulse signal, or a binary ONE in response to said second signal, or a binary ZERO in response to said third signal.

3. A system as in claim 2 wherein:
   said means for producing said CCT and PCT binary number includes at least one counter for counting said clock pulses to produce CCT and PCT and
   means are provided for storing the PCT number during the interval of each current pulse.

4. A system as in claim 3 wherein:
   said means for storing is a multistage register; and
   said means for comparing includes means for comparing CCT with PCT and producing said first, second and third signals.

5. A system as in claim 2 wherein:
   said output circuit includes means for generating a binary ZERO or a binary ONE output in response to said second and third output control signals respectively.

6. A system as in claim 5 wherein:
   said output circuit further includes a shift register for storing the prior output of said output circuit; and
   said shift register responds to the first output control signal by shifting said stored prior output of said output circuit to the output thereof.

7. A system as in claim 4 wherein:
   said means for comparing includes means responsive to the most significant bit of the larger of CCT and PCT for comparing said most significant bit with the bit of the same significance of the smaller of CCT and PCT, said bits being herein called CCT-1 and PCT-1, and producing said first, second and third output control signals as follows:
      said first signal when both CCT-1 and PCT-1 are binary ONE, or
      said second signal when PCT-1 is binary ONE and CCT-1 binary ZERO, or
      said third signal when CCT-1 is binary ONE and PCT-1 is binary ZERO.

8. A system as in claim 5 wherein:
   said means for comparing further includes means for comparing the next most significant bits of CCT and PCT, herein called CCT-2 and PCT-2, respectively, and producing said first, second and third output control signals as follows:
      said first signal when CCT-1 is ZERO, CCT-2 is ONE, PTC-1 is ONE and PCT-2 is ZERO and when CCT-1 is ONE, CCT-2 is ZERO, PCT-1 is zero and PCT-2 is ONE;
said second signal when CCT-1 is ONE, CCT-2 is ZERO, PCT-1 is ONE and PTC-2 is ONE; and
said third signal when CCT-1 is ONE, CCT-2 is ONE, PCT-1 is ONE and PCT-2 is ZERO.

9. A system as in claim 4 wherein:
said means for comparing includes means for comparing the N most significant bits of the larger of CCT and PCT with the N bits of the same significance of the smaller of CCT and PCT, said bits being herein called CCTN and PCTN, respectively, for producing said first, second and third output control signals as follows:
said first signal when CCTN and PCTN are both at least 100—N or
said second signal when PCTN is at least 100—N, and CCTN is less than 100—N, or
said third signal when CCTN is at least 100—N and PCTN is less than 100—N, 10. A system as in claim 7 wherein:
said first output control signal is also produced and said second and third output control signals are not produced when either CCTN or PCTN is at least 100—N and the other is no less than 011—N.

11. A system as in claim 9 wherein:
said second output control signal is also produced and said first output control signal is not produced when PCTN is at least 111—N and CCTN is no greater than 100—N.

12. A system as in claim 9 wherein,
said third output control signal is also produced and said first output control signal is not produced when CCTN is at least 111—N and PCTN is no greater than 100—N.

13. A system as in claim 9 wherein:
said first output control signal is also produced and said second and third output control signals are not produced when either CCTN or PCTN is at least 100—N and the other is no less than 011—N;
said second output control signal is also produced and said first output control signal is not produced when PCTN is at least 111—N and CCTN is no greater than 100—N, and
said third output control signal is also produced and said first output control signal is not produced when CCTN is at least 111—N and PCTN is no greater than 100—N.

14. In a system for detecting the successive binary bits of a binary number represented by magnetically recorded impulses along a magnetic tape moving past a magnetic detector head, where the bits represented by the impulses are spaced at regular spatial intervals along the tape and within each spatial interval is a single in-pulse of length, L, representing a binary ZERO bit or a pair of impulses each of length L/2, representing a binary ONE bit, electrical means responsive to the output of the magnetic detector head for producing signals representing the successive binary bits as the tape moves past the head comprising:
a bit detector;
means for moving the tape relative to the detector whereby the detector produces electrical pulse representing detected bits;
means responsive to said pulses for producing a signal CT, representative of the time duration of the current pulse and a signal PT representative of the time duration of the pulse prior to the current pulse;
means for comparing CT and PT producing comparison signals;
means responsive to said comparison signals for producing output control signals as follows:
a first signal when the ratio of the larger of CT and PT to the smaller is less than R,
a second signal when the ratio of PT to CT is greater than R and
a third signal when the ratio of CT to PT is greater than R;
an output circuit for producing a binary ONE signal or a binary ZERO signal representative of the current pulse and for storing binary output thereof representative of the pulse immediately prior to said current pulse; and
said output circuit is responsive to said first, second and third output signals producing a binary ONE or a binary ZERO output signal representative of the current pulse as follows:
said stored binary output in response to said first signal, or
a binary ONE in response to said second signal, or
a binary ZERO in response to said third signal.

15. In a system for detecting the number represented by a serial modulated pulse time envelope signal subject to a changing time rate, electrical apparatus comprising:
means for detecting said pulses;
means responsive to said pulses for producing a signal CT, representative of the time duration of the current pulse and a signal PT representative of the time duration of the pulse prior to the current pulse;
means for comparing CT and PT producing comparison signals;
means responsive to said comparison signals for producing output control signals as follows:
a first signal when the ratio of the larger of CT and PT to the smaller is less than a predetermined value R,
a second signal when the ratio of PT to CT is greater than R and
a third signal when the ratio of CT to PT is greater than R;
an output circuit for producing a binary ONE signal or a binary ZERO signal representative of the current pulse and for storing binary output thereof representative of the pulse immediately prior to said current pulse; and
said output circuit is responsive to said first, second and third output signals producing a binary ONE or a binary ZERO output signal representative of the current pulse as follows:
said stored binary output in response to said first signal, or
a binary ONE in response to said second signal, or
a binary ZERO in response to said third signal.

* * * * *